United States Patent [19]

Morelock

[11] 3,738,314

[45] June 12, 1973

[54] FILAMENT COATING APPARATUS INCLUDING MERCURY CONTACT HEATING MEANS

[75] Inventor: Charles R. Morelock, Ballston Spa, N.Y.

[73] Assignee: General Electric Company, Schenectady, N.Y.

[22] Filed: Jan. 13, 1971

[21] Appl. No.: 106,261

Related U.S. Application Data

[62] Division of Ser. No. 714,853, March 21, 1968, Pat. No. 3,565,683.

[52] U.S. Cl.................. 118/49.5, 219/155, 266/3 R
[51] Int. Cl............................................ C23c 13/10
[58] Field of Search ............... 118/405, 49.1, 49.5, 118/620; 117/93.2, 93; 219/155; 266/3 R; 339/117 R, 118 R

[56] References Cited

UNITED STATES PATENTS

| | | | |
|---|---|---|---|
| 1,118,418 | 11/1914 | Henderson | 118/49.5 UX |
| 1,144,595 | 6/1915 | Henderson | 118/405 X |
| 1,710,747 | 4/1929 | Smith | 118/49 UX |
| 2,679,823 | 6/1954 | Denham | 118/405 |
| 3,549,424 | 12/1970 | Rice | 118/49.1 X |
| 3,452,711 | 7/1969 | Reeves et al | 118/49.5 |

Primary Examiner—Morris Kaplan
Attorney—Richard R. Brainard, Paul A. Frank, Charles T. Watts et al.

[57] ABSTRACT

Heating means in a vapor deposition chamber includes a plurality of electrical contacts. Each contact is formed by a receptacle containing mercury through which the filament substrate passes. To facilitate threading of the filament, the receptacle bottom wall is formed from a foraminous material.

1 Claim, 3 Drawing Figures

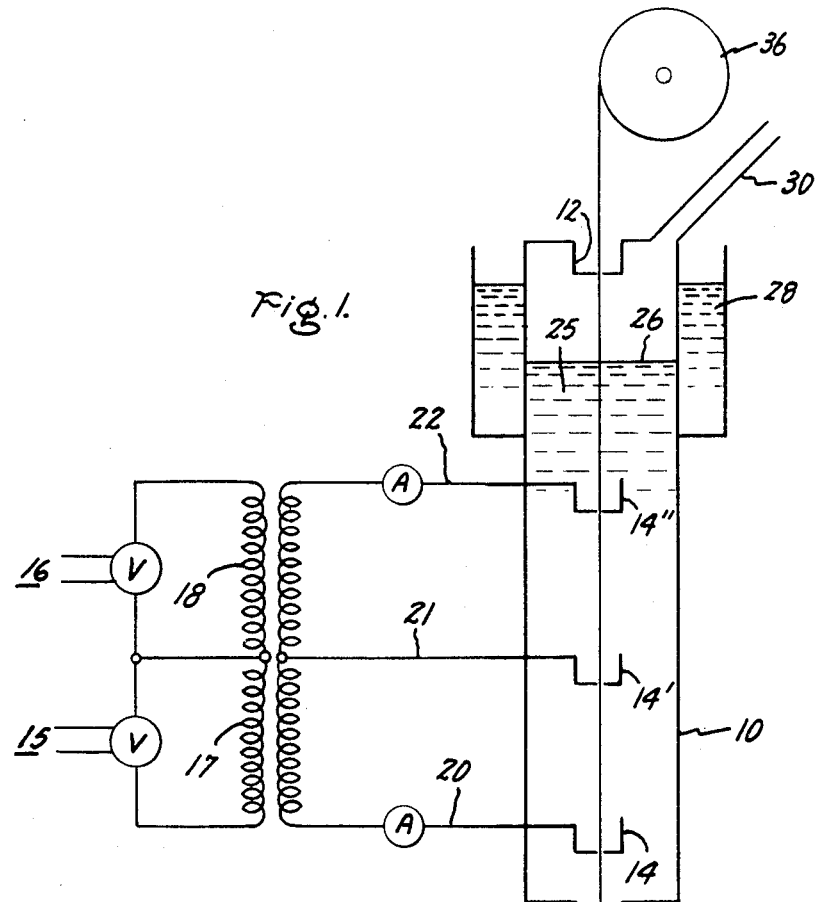
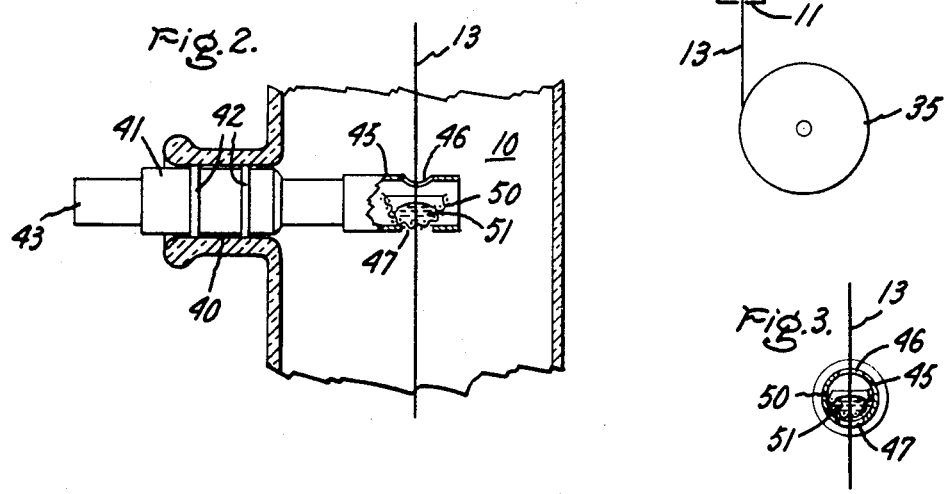

FILAMENT COATING APPARATUS INCLUDING MERCURY CONTACT HEATING MEANS

This application is a division of application Ser. No. 714,853, filed Mar. 21, 1968, now U.S. Pat. No. 3,565,683, and assigned to the same assignee as the present application.

CROSS-REFERENCES

Cross-reference is hereby made to the copending application of the present inventor, Ser. No. 586,809, filed Oct. 14, 1966, now U.S. Pat. No. 3,479,205 assigned to the assignee of the present invention, and entitled "Process for Producing Boron Filament;" the disclosure of which is incorporated by reference herein.

BACKGROUND OF THE INVENTION

As described in greater detail in the previously referenced copending patent application, continuous filaments having superior mechanical and/or chemical properties have been manufactured by pyrolitically depositing boron on the surface of a fiber of a siliceous material, preferably a fused silica or quartz fiber having an electrically conductive pyrolytic carbon coating. In general, this may be done by passing the carbon coated filament through a reaction chamber containing a thermally decomposable boron containing gas such as, for example, diborane or, more preferably, boron trichloride, and resistively heating the filament by passing an electric current through the conductive carbon coating to a temperature at which the boron containing gas is decomposed to deposit elemental boron on the surface of the filament. It is convenient to utilize a pair of spaced pools of mercury as the contacting electrodes through which the filament passes. It is necessary for effective deposition that the current carrying capability of the carbon coating be sufficiently great enough to pass sufficient current to attain the necessary surface temperature to decompose the boron compound gas. To ensure adequate current carrying capacity, the carbon coated filament is first passed through a reaction chamber similar to that previously described except that a thermally decomposable carbonaceous gas is employed in place of the boron compound gas whereby additional pyrolytic graphite is deposited on the filament surface. However, as the thickness of the carbon layer is increased in order to increase the current carrying capacity, a number of undesirable side effects occur. As the carbon thickness is increased, the bulk mechanical properties decrease. Residual stresses are increased which can result in delamination. The increase in the size of the filament due to the thicker carbon layer is not desirable if it could be avoided. Furthermore, in the gas reaction apparatus, the mercury electrodes become heated and will fail unless cooled which requires a relatively complicated electrode structure.

In view of the foregoing, it would be desirable to provide a method and an apparatus for continuously coating a fused quartz or silica filament with a material which has an intrinsically higher electrically conductivity than carbon, is mechanically stronger than carbon, is at least as chemically inert as carbon, and such are the principal objects of this invention.

SUMMARY OF THE INVENTION

Briefly stated, and in accordance with one aspect of the invention, apparatus is presented whereby a fused silica or quartz fiber having an electrically conductive pyrolytic carbon film coating thereon is coated with a boro-carbon conductive coating by resistively heating the carbon coated filament in a liquid bath composed of an organic solvent having a thermally decomposable boron compound dissolved therein.

The invention will be better understood from the following detailed disclosure taken in conjunction with the accompanying drawing in which FIG. 1 is a schematic illustration in vertical section of one embodiment of apparatus suitable for the practice of the invention.

FIG. 2 is a detailed section of a portion of the apparatus showing an embodiment of an electrode suitable for use in the practice of the invention, and FIG. 3 is an end view with parts broken away of the electrode shown in FIG. 2.

More specifically and with particular reference to the drawing, the embodiment of the invention schematically illustrated in FIG. 1 includes a substantially enclosed reaction chamber 10 which is provided with entry means 11 and exit means 12 whereby a continuous filament 13 of pyrolytic carbon coated fused silica or quartz is passed through the reaction chamber. The entry and exit means are provided with seal means which permit the free passage of filament 13 but which are effective to prevent loss of liquid from the interior of the reaction chamber through the entry means 11 or the escape of gases or the entry of atmospheric air through exit means 12. While any effective seal means may be used, the mercury pool seals disclosed by the previously referenced copending application are simple and effective.

As shown in FIG. 1, a plurality of vertically spaced substantially identical electrodes 14, 14' and 14" are positioned in the reaction chamber 10 and in electrical contact with filament 13. Electrical power is supplied to the electrodes from A.C. sources 15 and 16 through transformers 17 and 18 and leads 20, 21 and 22. Voltmeters and ammeters are shown by the symbols "V" and "A" respectively.

The interior of chamber 10 contains a liquid boron containing reactant 25 to a level 26 which is above electrode 14" so that all of the electrodes are submerged in the liquid. Cooling means are provided in heat exchange relationship with at least the upper portion of the side walls of reaction chamber 10. As shown, the cooling means may comprise an ice-water bath 28, although any functionally equivalent means may be used. Conduit 30 is provided at the top of the reaction chamber and is used to remove noncondensible reaction products from the reaction chamber and may be used to replenish the liquid reactant as it becomes depleted.

In operation, a quantity of the pyrolytic carbon coated filament which usually has a diameter of 1 mil or less which is wound upon a supply reel 35 is threaded through the inlet means 11, passed through the reaction chamber 10 in electrically contacting relationship with electrodes 14, 14' and 14", threaded through the outlet means 12 and secured to take up reel 36. The boron containing liquid reactant 25 is poured into the chamber up to the level 26 and the ice-water bath 28 is filled.

The take up reel 36 is then driven at a predetermined rate pulling the filament from the supply reel 35 through the reaction chamber 10 while electric current from the power supply causes the conductive coating to be resistively heated between electrodes 14 and 14' and between electrodes 14' and 14" to a temperature above the boiling point and thermal decomposition temperature of the liquid reactant, producing a vapor envelope about the filament from which the solid reaction product is deposited upon the surface of the filament. As the temperature of the liquid reactant 25 increases in zones adjacent to the heated filament portions, it rises by convection to the upper portion of the chamber where it is cooled by heat exchange with the cooling means 28. Any condensible vapor produced is condensed by the cooling means and returned to the body of liquid 25 and any non-condensible gas produced is removed by conduit 30.

In a specific working example of the invention, reaction chamber 10 was constructed from hard glass tubing having an inner diameter of 1 inch and a length of 8 inches, closed at each end and provided with an integral conduit 30. Entry means 11 and exit means 12 comprised cup-like members provided with centrally located apertures and containing a pool of mercury as a sealing means. Electrodes 14, 14' and 14" were of substantially identical construction as shown in FIGS. 2 and 3. As shown in FIG. 2, the side wall of reaction chamber 10 is provided with a tubular opening 40 through which electrode 14 extends. A cylindrical portion 41 substantially fills the tubular opening 40 and a pair of O-ring seals 42 prevents the liquid reactant 25 from leaking around the electrode. The outer end 43 of the electrode 14 is adapted to be electrically connected to lead 20. The inner end of the electrode comprises a tubular portion 45 having upper and lower apertures 46 and 47, respectively. Supported within the tubular portion 45 is a foraminous basket-like structure 50 which is composed of 60 mesh molybdenum wire screen which contains a pool of mercury 51. The openings of the screen are small enough so that the surface tension of the mercury prevents it from leaking through the screen, but are large enough so that the filament 13 freely passes therethrough. With this construction, there are a large number of apertures available through which filament 13 may be passed, greatly simplifying threading the filament through the electrodes, and, making it unnecessary to precisely line up the electrodes as is the case when single aperture electrodes are used. As previously stated, electrodes 14' and 14" were similarly constructed and mounted in vertically spaced relationship in the side wall of chamber 10. In this particular apparatus, electrode 14' was located about 2½ inches above electrode 14, and electrode 14" was about 3½ inches above electrode 14'.

The pyrolytic carbon coated fused silica filament 13 was 1 mil in diameter and about 400 feet long with an electrical resistance of $195 \times 10^3$ ohms per inch. The filament was threaded through seal 11, electrodes 14, 14' and 14", and seal 12, as indicated in FIG. 1. The liquid reactant comprised 30 percent boron trichloride dissolved in benzene and the reaction chamber 10 was filled with this solution to a level about 2 inches above electrode 14". The filament was pulled through the reaction chamber by take up reel or spool 36 at the rate of 10 feet per minute and power was supplied between electrodes 14 and 14' until the ammeter reading was 8 milliamperes. Power was then applied to electrodes 14' and 14" until the ammeter reading was 15 milliamperes. During the run, the filament temperatures between the electrodes were about 1,100° C and the gas from the envelope formed about the heated filament portions was recondensed by the cool liquid reactant as previously set forth. One of the reaction products is HCl which is a non-condensible gas in this anhydrous reaction and is removable through conduit 30 as previously described. The reaction was continued under the above stated conditions until all of the filament from supply reel or spool 34 was used, about 40 minutes of running time.

The resulting filament was found to have a uniform boro-carbon coating about 1 micron in thickness and an electrical resistance of about 9,300 ohms per inch. The coating formed at the beginning of the run was found to be substantially identical in all respects to that formed at the end of the run and at all points therebetween.

Other runs were made using the same apparatus with substantially identical filaments but in which toluene was substituted for the benzene and at rates as low as 4 feet per minute and substantially identical results were obtained.

The so-coated fused silica filaments have utility per se as electrical resistors having a high degree of uniformity with respect to their physical and electrical properties, particularly in corrosive or chemically reactive environments. While only a two stage reactor has been shown, it is apparent that as many stages as desired may be used and coatings of greater thickness and hence lower electrical resistance may be made.

Boro-carbon coated filament made as previously described has been used for boron deposition in a gas phase reaction from a boron trichloride-hydrogen atmosphere at temperatures of about 1,000° to 1,100° C as taught by the previously referenced copending application, but without the pyrolytic carbon deposition step disclosed therein. It will also be apparent that by cooling the side walls of the reaction chamber 10 so as to maintain the interior thereof at a temperature below 12.5° C, the boiling point of liquid boron trichloride, that a boron coating may be deposited upon the boro-carbon coating in a liquid phase reactor similar in all other respects to that shown in FIG. 1.

While benzene and toluene have been disclosed as operative solvents in the practice to illustrate the apparatus of the invention, it is believed that any non-polar, organic solvent for boron trichloride which does not have a hydroxyl group, such as alcohol, will also be satisfactory, providing it is pyrolytically decomposable to deposit carbon on the filament surface along with the boron from the pyrolytic decomposition of the boron trichloride. The hydrogen so produced combines with the free chlorine to produce hydrogen chloride which is pumped off.

While certain specific embodiments of said practice have been disclosed as exemplary, it will be apparent to those skilled in the art that many variations are possible, all within the scope of the invention. For example, it has been found that the relative proportions of boron trichloride and solvent are not critical, the rate at which the filament may be drawn through the apparatus is not critical, and many other variations may be made. While a pyrolytic carbon coating on the fused silica fiber has been disclosed, any electrically conductive material may be substituted therefor, provided the film is continuous and does not chemically or physically react with the substrate. Furthermore, the pyrolytic decomposition and deposition of other materials is contemplated. For example, a solution of tungsten hexachloride in benzene has been found to be usable in the apparatus disclosed for the deposition of a layer of tungsten carbide on the surface of such a filamentary body. Yet further, such depositions may be made upon the surface of filamentary bodies composed of metallic filaments or wires instead of the pyrolytic carbon coated fused silica filaments, such as, for example, filamentary tungsten, beryllium copper, ferrous alloys and other metallic materials. While in the specific example disclosed, a solvent which is non-polar, non-ionically conductive and free of hydroxyl radicals is preferred, it is contemplated that, depending upon the nature of the solute, that these restrictions may be relaxed somewhat. For example, a liquid medium may be employed which is not completely non-polar but which has an electrical resistivity which is sufficiently higher than the electrically conductive path provided by the filamentary body so that sufficient current preferentially flows through the body to effect the purposes of the invention. Also, solvents are contemplated which are free of carbon, such as hydrazine, for example, so that carbon is not co-deposited with the pyrolysis product of the solute. Yet further, complexes may be formed between the solute and the liquid constituent with advantageous results. It is also contemplated that the liquid reactant may not be a true solution but be a colloidal suspension. Therefore, it is not intended to limit the scope of the invention except as set forth in the appended claims.

What I claim as new and desire to secure by Letters Patent of the United States is:

1. An apparatus comprising a reaction chamber adapted to contain a fluid reactant, entry means for introducing an elongated filamentary body into said chamber, exit means for permitting said filamentary body to be withdrawn from said chamber, sealing means operatively associated with said entry means and said exit means for preventing the leakage of reactant fluid from the interior of said chamber and the leakage of fluids from the exterior of said chamber into said chamber while permitting free passage of said filamentary body therethrough, said entry and exit means being in opposed spaced relationship to each other and defining a straight line path for said filamentary body through the interior of said chamber, a plurality of spaced electrical contact means in said chamber, each said contact means having means located in said straight line path for establishing electrical contact with said filamentary body, said last recited means comprising a support member, a container supported by said member for a metallic material which is in the liquid state under the conditions of the reaction, said container have a foraminous wall portion thereby providing a large number of openings located in said straight line path and providing a support for said liquid metallic material, the openings in said foraminous wall portion being of a size which permits ready passage of said filamentary body therethrough thereby simplifying the threading of a filament through each of the contact means but of insufficient size for the passage of the liquid metal therethrough, means for extracting heat from the reactant fluid within the chamber, electrical means for supplying electrical energy to said filamentary body between an adjacent pair of said electrical contact means, and means for passing said filamentary body in a substantially continuous manner through said reaction chamber.

* * * * *